United States Patent [19]
Lee

[11] Patent Number: 5,913,817
[45] Date of Patent: Jun. 22, 1999

[54] ELECTRICAL ISOLATION OF ENDOSCOPIC VIDEO CAMERA

[75] Inventor: David B. Lee, Goleta, Calif.

[73] Assignee: Karl Storz Imaging, Goleta, Calif.

[21] Appl. No.: 08/915,120

[22] Filed: Aug. 20, 1997

Related U.S. Application Data

[63] Continuation-in-part of application No. 08/418,139, Apr. 5, 1995, Pat. No. 5,716,323.
[51] Int. Cl.$^6$ ........................................................ A61B 1/04
[52] U.S. Cl. ............................................. 600/134; 348/76
[58] Field of Search .................................. 600/101, 109, 600/134, 117, 118; 348/76, 296; 128/901

[56] References Cited

U.S. PATENT DOCUMENTS

| | | | |
|---|---|---|---|
| 4,706,118 | 11/1987 | Kato et al. | 348/76 |
| 4,803,562 | 2/1989 | Eino | 348/76 |
| 4,831,444 | 5/1989 | Kato | 348/65 |
| 4,868,647 | 9/1989 | Uehara et al. | 348/76 |
| 4,931,867 | 6/1990 | Kikuchi | 348/76 |

Primary Examiner—John P. Leubecker
Attorney, Agent, or Firm—Donald D. Mon; David O'Reilly

[57] ABSTRACT

A video camera isolation system and method for use with video cameras that are coupled to endoscopes that utilize simple pulse transformer technology to isolate the video camera head from the video processing circuitry allowing the processing circuitry to be referenced to ground. The video signal from the CCD sensor in the camera head is specifically processed to prevent shutter pulses from interfering with the isolated video signal. Special circuitry blanks the shutter pulse from the pulse transformer. Timing errors due to cable length delays are corrected by means of a pilot signal which correlates with the CCD output signal. Open collector data circuitry is also specially processed by dual channel detecting and amplifying circuits which are transistor switched through the pulse transformers before being delivered to and from the camera head. Timing pulses are processed through logic buffering conditioning circuitry and pulse transformers for reconstruction on the secondary of the pulse transformer by hysteresis buffers. Cable delay compensating is provided by pilot pulse received from a CCD driver that is applied to a correlated double sampling pulse generator having an output to a correlated double sampling circuit to recover the output signal from the CCD sensor. The circuits described allow simple pulse transformer technology to effectively isolate the video camera head connected to an endoscope from the electronic circuitry.

29 Claims, 3 Drawing Sheets

ELECTRICAL ISOLATION OF ENDOSCOPIC VIDEO CAMERA

This application is a Continuation-in-Part of application Ser. No. 08/418,139 filed Apr. 5, 1995, now U.S. Pat. No. 5,716,323.

BACKGROUND OF THE INVENTION

1. Field of the Invention

The present invention relates to electrical isolation of an endoscope video camera, and more particularly relates to a isolation circuit for electronic endoscopic camera apparatus which is uniquely simple and low in cost.

2. Background Information

Endoscopic video systems are now used with endoscopes in general surgery. The endoscope may be a passive optical device which is attached to an external image sensor or may contain electronic circuitry including a charge coupled device (CCD) image sensor mounted at the distal end or elsewhere. An umbilical connects the sensor-endoscope assembly, (hereinafter referred to as the camera head) to a video processing support unit that obtains operating power from the commercial power mains, and provides a ground-reference video output. New and more demanding safety regulations require that electrical isolation be provided between the camera heads which makes physical contact with the patient and the processing electronics.

One method of providing such isolation is through the use of a transformer isolation circuit applied in the electrical path between the camera head and processing electronics. In this method, the camera head assembly is connected by an umbilical support unit with a ground reference video output that is connected to commercial powers A transformer isolation circuit is provided by a plurality of separate circuits, each dedicated to a particular signal required by the video system.

The CCD image sensor requires a large number of drive signals, some of which are high frequency, over 10 MHz. Furthermore, the CCD output signal also has a high frequency pixel rate. This complicates the design of previous isolation circuits and methods have been devised to find ways to reduce the required number, and bandwidth, of such circuits as shown in the U.S. Pat. No. 4,931,867 of Kikuchi issued Jun. 5, 1990. This method requires additional, redundant circuitry to be added to the isolation part of the endoscopic video system.

Another attempt to reduce noise in video signal transformer isolation circuits is by driving the transformer differentially and providing DC restoration with a so called "one pixel clamp" as disclosed in U.S. Pat. No. 4,868,647 of Uehara et al issued Sep. 19, 1989. This patent also shows the method of driving a transformer with a carrier wave modulated by the CCD output after it has been converted to the base-band by double correlated sampling. Uehara et al also disclose using a delay line and differential drive technique to suppress noise from the CCD reset pulse. These techniques add complexity and cost to the overall isolation circuitry. It would be more desirable to develop an isolation system that requires a minimum overall number and variety of components without unreasonable compromise to performance.

It is one object of the present invention to provide a medical electronic endoscope system which can sufficiently guarantee the safety of the patient by means of an electrical isolation of the endoscope.

Another object of the present invention is to provide a medical electronic endoscope system, having isolation circuitry that is low in cost and uses a minimum variety of components.

Still another object of the present invention is to provide electrical isolation of a medical electronic endoscope system that uses low-cost pulse transformer circuitry.

Yet another object of the present invention is to provide electrical isolation of medical endoscopic camera electronics using technology that maintains strict leakage and insulating isolating requirements with simple electronic circuitry.

Still another object of the present invention is to provide a medical endoscopic camera system electronics with electrical isolation that suppresses noise in CCD output signal from the CCD reset pulse.

Yet another object of the present invention is to provide electrical isolation of medical endoscopic camera electronics that can process and isolate bi-directional data signals.

Still another object of the present invention is to provide isolation of medical endoscopic camera electronics by isolating open collector bi-directional data signal lines using electronic shunts on the primary and secondary side of a pulse transformer.

Still another object of the present invention is to provide electrical isolation of medical endoscopic camera electronics that isolate timing signals by converting the timing signals to leading and lagging spikes which are reconstructed on the secondary side of a pulse transformer.

BRIEF DESCRIPTION OF THE INVENTION

The purpose of the present invention is to use simple electronic circuits to electrically isolate the camera head in a medical endoscopic video camera system from the camera electronics. Coupling of endoscopic video cameras, for use in endoscopic procedures, is described and illustrated in U.S. Pat. No. 5,168,863 of Kurtzer, issued Dec. 8, 1992 and incorporated herein by reference.

In the preferred embodiment of the invention disclosed herein, video camera timing signals are generated by a reference oscillator in a conventional manner. The plurality of timing pulses needed to operate the CCD image sensor are coupled in the isolated circuitry by a plurality of low cost, simple, isolation circuits which all use the same type of transformer. The transformer is a pulse type, commonly used to isolate data communication signals such as ethernet 10 Base-T, but modified slightly to meet medical safety standards.

The CCD output signal is amplified at the camera head and resistively divided down at the transformer to provide a degree of noise reduction. A low level, low impedance signal is driven directly into the transformer without saturating it. Removal of the CCD reset pulse, or shutter pulse noise, is however, necessary to prevent transformer saturation and subsequent distortion of the video signal. This is accomplished by a switch which is activated by the shutter drive pulse, which breaks the transformer circuit, and prevents the noise from inducing current into the transformer winding.

Because the CCD signal at the transformer output is at a very low level, it is applied directly to a correlated double sampling stage without the need for pixel rate clamping. Sample timing from the timing generator cannot be used because the CCD signal has suffered a cable length delay from the umbilical To generate the needed sample pulses, the pilot signal from the camera head is routed parallel with the CCD signal and passed directly through it's own transformer to a pulse generating circuit which creates pulses synchronous with the CCD output, and independent of variations in cable length or propagation delay. Once the sampling process has been completed, the signal can be processed conventionally to provide a standard video output.

The camera head contains control features that require digital communication with the processor unit. These must also be isolated in a manner that will allow bi-directional data transfer in an open collector format. This is accomplished by passing a carrier signal into the grounding side of the transformer, and using a shunt switch scheme that can attenuate the carrier from either the primary or secondary winding A detector, at each winding converts the carrier level into a logic level. This way, the open-collector feature is emulated across an isolation channel.

Input power for the isolated circuitry is provided by a typical commercial power supply with an isolated output conforming to medical safety standards.

The above and other objects, advantages and novel features of the invention will be more fully understood from the following detailed description when considered in conjunction with the accompanying drawings.

DETAILED DESCRIPTION OF THE INVENTION

Figure 1:
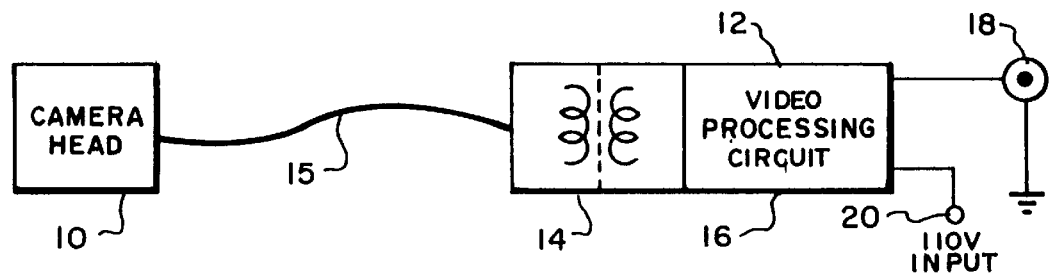
FIG. 1 is block diagram illustrating isolation of an endoscopic video camera head through using transformer isolation circuits from camera electronics.

A method of providing isolation between the camera head and processing electronics by use of transformer isolation circuitry is illustrated in FIG. 1. Camera head 10 having CCD sensor and other electronics is isolated from camera electronics 12, that includes transformer isolation circuit 14 and video processing circuit 16 connected through umbilical cord 15. Video processing circuit 16 is part of the camera electronics that processes the signal from camera head 10 to provide a video output at terminal 18. Input power at terminal 20 is obtained from commercial power lines applied to a typical commercial power supply having an isolated output conforming to medical safety standards.

Figure 2:
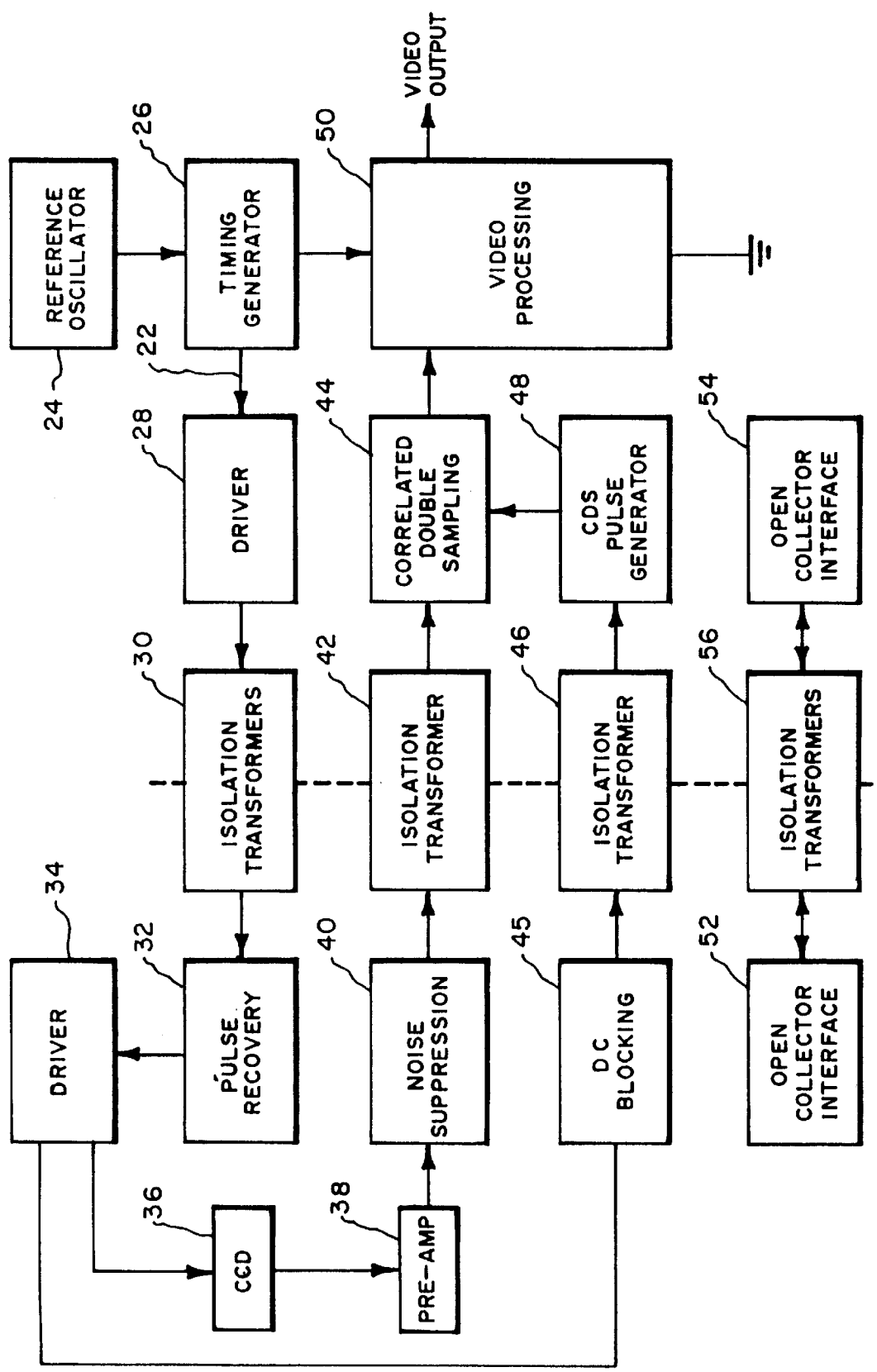
FIG. 2 is an overall block diagram of the endoscopic camera system emphasizing the functions relevant to the isolation circuitry of the invention.

FIG. 2 is a block diagram of a preferred embodiment of the invention. Camera head drive signals on line 22 are generated by conventional means of reference oscillator 24 and timing generator 26. These signals include a pixel-rate clock, six interline and field transfer pulse signals and a reset pulse that can be used as an electronic shutter. When the reset pulse is activated it creates an impression on the CCD output known as "reset noise", or "shutter pulse noise." This noise is a large pulse many times greater in magnitude than the CCD signal.

A plurality of identical pulse isolation circuits, each having it's own driver 28, isolation transformer 30 and pulse recovery circuit 32, driving pulses down umbilical 15 (FIG. 1) to camera head 10. The plurality of pulse isolation circuits are described in greater detail hereinafter.

In camera head 10, a plurality of drivers 34, buffer the signals and drive them into CCD image sensor 36 to generate an output signal. The CCD signal is amplified at camera head 10 and driven down umbilical 15 by amplifier or pre-amp 38. Amplifier 38 provides a high gain to reduce the interference from cable cross talk and ambient noise. The CCD signal level is reduced to a low level, that conforms with the linear range of isolation transformer 42 by noise suppression circuit 40, which is preferably a resistive divider. The CCD signal passes directly through isolation transformer 42 into correlated double sampling stage 44.

When a shutter pulse is applied to the CCD, reset noise is present on the output signal. To suppress noise, a switch in noise suppression circuit 40 is actuated by the reset drive pulse and opens isolation transformer circuit 42 to prevent transformer saturation as will be described in greater detail hereinafter.

Camera head driver 34 provides timing reference by driving a pilot pulse down umbilical 15 in parallel with the CCD output so that double correlated sample pulses can be generated without concern for cable length delay. The pilot pulse passes directly through DC blocking circuit 45, isolation transformer 46 into CDS pulse generator 48, which generates the pulses needed to implement correlated double sampling circuit 44 and convert the CCD signal to baseband. The base-band image signal is processed by video processor 50 into a standard video output signal.

Digital data is also passed to and from camera head 10 in an open collector format. A plurality of two independent isolated open collector channels, which provide a bi-directional data path, is represented by open collector interfaces 52 and 54, and isolation transformers 56. Digital data processing will be described in greater detail hereinafter.

Figure 3:
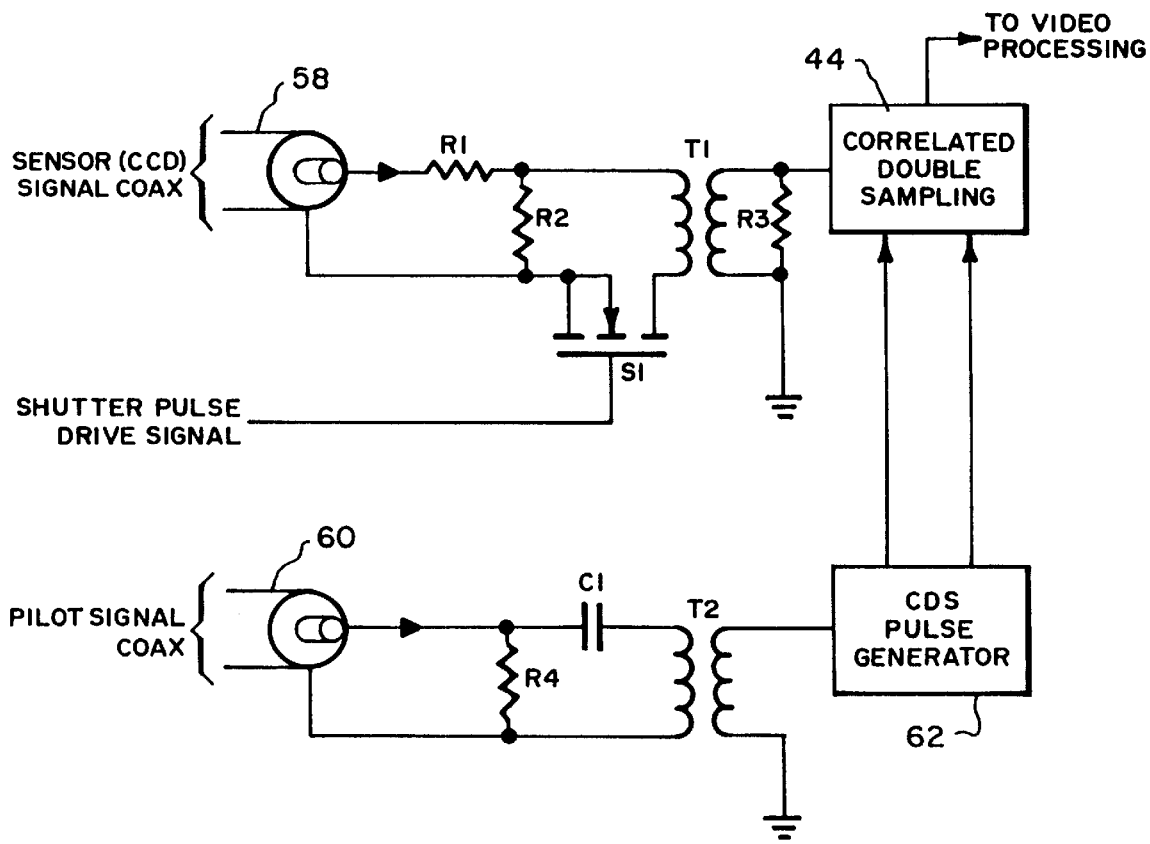
FIG. 3 is a simplified schematic diagram of the CCD output signal isolation, and pilot signal isolation, illustrating noise reduction and double correlated sampling.

The noise suppression circuit 40, isolation transformers 42 and correlated double sampling circuit are illustrated in greater detail in FIG. 3. The CCD output signal and pilot signal are applied to coax lines 58 and 60, which terminate at resistors R1, R2 and R4 respectively. DC blocking capacitor C1 prevents the DC component of the logic-level pilot signal from entering transformer T3 saturating it. Correlated double sampling pulse generator 62 uses the rising and falling edges of the output from transformer T3 to generate pulses suitable for correlated double sampling of the CCD signal across resistor R3.

CCD signal from voltage dividing resistor combination R1 and R2 is terminated and divided down to a level which complies with the linear region of the transformer T1. Resistor R3 works in parallel with resistor R2 to provide a distributed termination and ensure a low impedance on both windings. Shutter noise is suppressed by solid state switch S1, causing it to open and prevent any current from flowing into primary winding or transformer T1. Switch S1 is typically a MOSFET device designed to respond to logic level signals.

The correlated double sampling circuit consists of a DC blocking capacitor and a correlated double sampling (CDS) device such as a Model No. CXA1390, manufactured by Sony Electronics Corporation. Because of the low signal level, and relatively long time constant of the transformer circuit, it is not necessary to provide a pixel rate clamp to the CCD output across resistor R3, provided CCD reset noise is suppressed.

Figure 4:
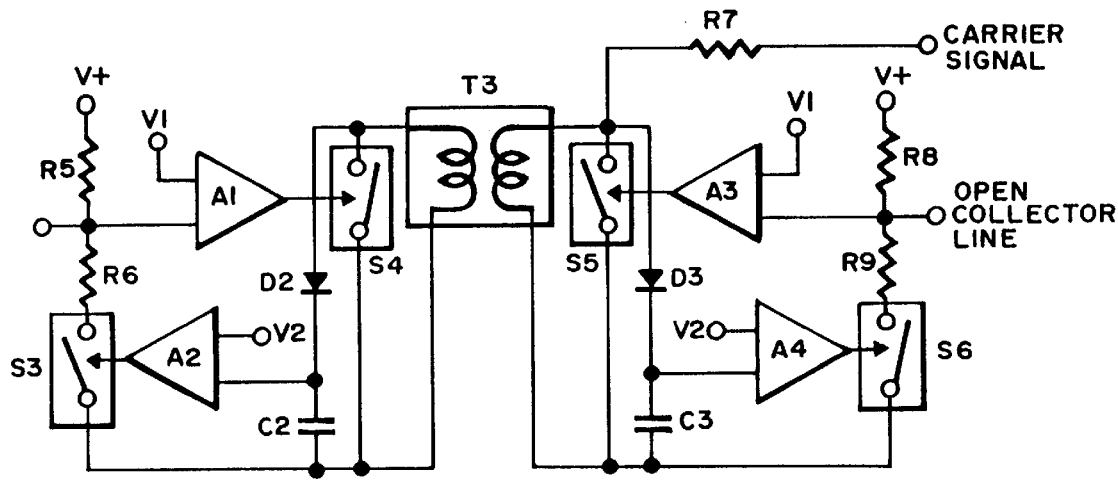
FIG. 4 is a simplified schematic diagram of isolation circuitry for isolating bi-directional signals on an open collector data line.

The bi-directional data path for digital data and special technique used for processing bi-directional open collector data signal is shown in the simplified schematic diagram of FIG. 4. Open collector data signal isolation circuit 52 (FIG. 2) uses pulse transformer T3 because it has the useful ability to transfer impedance from one winding to another, regardless of direction (primary to secondary or vice versa) so it can be used for isolation by representing a logical state as an impedance. The impedance is provided by an electronic shunt switch connected to both windings of transformer T3, and applying an AC voltage source (a carrier signal) to one of the windings through resistor R7. When primary switch S5, or secondary switch S4 is closed, the level of the carrier signal drops on both sides of transformer T3 analogous to the level drop of an open collector line. This signal is translated into an open collector logic signal by a pair of detectors represented by amplifier A3 and amplifier A4, diode D3 and capacitor C3 respectively.

To translate the carrier signal into an open collector logic signal, the carrier is first detected by transistor/capacitor circuit represented by amplifier A4, capacitor C3 and diode D3 on one side of pulse transformer T3.

A method is also provided to detect a low carrier level as a result and by transistor capacitor circuit comprised of amplifier A2, capacitor C2 and diode D2 on the secondary side of transformer T3. The signal is translated into a logic level by open collector solid state switch S6 in combination with series resistors R8 and R9 for pull-up and solid state switch S3, with series resistors R5 and R6 for pull-up. When the level of the carrier signal is above the level of the reference voltage V2, applied to transistor amplifier A4, the logic output is high and vice versa.

A method is also provided to detect a low carrier level, as a result of a low logic level on the same side, or on the secondary side of transformer T3, so the system will not lock itself in a low state (latch-up) while sending a low level signal. A low carrier level is detected by placing a small offset in the pull-down level of solid state switches S3 and S6. When solid state switch S6 is closed, resistor R9 keeps a low voltage level above the level of reference voltage V1, applied to transistor amplifier A3, which then ignores it. When a standard open collector device signal pulls the line low, it will pull below the level of reference voltage V1, and cause transistor amplifier A3 to close solid state switch S5 and transmit a low level signal across pulse transformer T3. Solid state switch S3, resistor R6 and transistor amplifier A1, on the opposite side of pulse transformer T3, work in the same manner.

Figure 5:
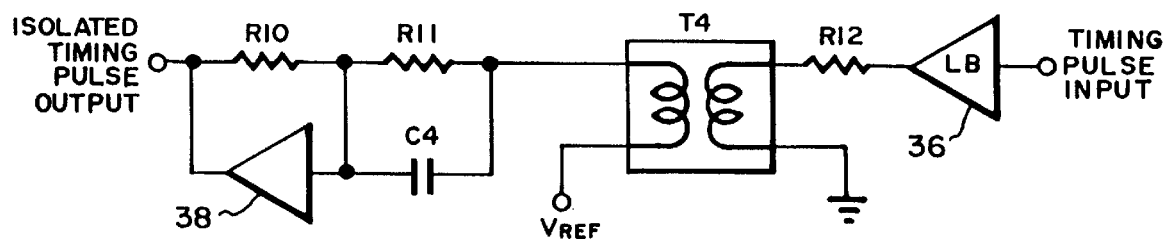
FIG. 5 is a simplified schematic diagram of a typical isolation circuit for each timing pulse signal going to the video camera head.

The plurality of pulse isolation circuits represented by drivers 28, isolation transformers 30 and pulse recovery circuits 32, is illustrated in greater detail by the circuits shown in the simplified schematic diagram of FIG. 5. Each timing pulse signal on line 22 referred to in FIG. 2, is isolated by the circuits shown in the schematic diagram. This circuit extends the pulse width range of transformer T4 by means of a logic buffer which has been configured with resistors R10 and R11 to have a hysteresis input at the junction of resistor R11 and capacitor C4. Since the timing pulses are much longer than the time constant [T=L/(R10+R11)] of pulse transformer T4, only the L/R spikes representing the leading and lagging edges of the timing pulse are passed through transformer T4 into capacitor C4 and resistor R11. The reference side of transformer T4 is set to a voltage that is midway between the high and low logic levels, typically 2.5V, so that these spikes can easily change the buffer state when they follow the rising or falling edge of the input pulse. Capacitor C4 provides a speed-up effect to compensate for the delay due to parasitic capacitors on the logic gate input (not shown). Because there is no limit to the duration of the pulses that can be passed, this circuit has the equivalent function of an opto-isolator, but offers much greater speed, owing to the high bandwidth of transformer T4, and less cost.

Thus, there has been described separate circuitry which isolates an endoscopic video camera head from the camera electronics. The signals needed to support the endoscopic video camera head are isolated with simple transformer circuits, all of which use the same type of pulse transformer and inexpensive components, but are as fast as expensive opto-isolators. In the CCD signal path, a simple switch can be used to suppress shutter pulse noise and a pixel rate clamp is not required. Sample timing delays due to cable length are compensated for without the need for delay lines, by using a pilot pulse to generate synchronized pulses. The bi-directional open collector data signals are isolated with special switching circuits to allow the process that can sense direction and maintain speed.

This invention is not to be limited by the embodiment shown in the drawings and described in the description which is given by way of example and not of limitation, but only in accordance with the scope of the appended claims.

What is claimed is:

1. An electrical isolation circuit for endoscopic video cameras comprising;
   a video camera having a CCD sensor;
   an electronic video processing circuit include a plurality of signal lines transmitting signals between said electronic video processing circuit and said video camera;
   electrical isolation circuit means interposed between said electronic video processing circuit and said video camera for providing electrial isolation therebetween; and
   cable delay compensating means compensating for cable delay of a video signal from said CCD sensor.

2. The electrical isolation circuit according to claim 1 wherein; said electrical isolation circuit means comprises a plurality of pulse transformers.

3. The electrical isolation circuit according to claim 2 in which said plurality of pulse transformers comprise a separate pulse transformer for each signal line between said electronic video processing circuit and said video camera.

4. The electrical isolation circuit according to claim 3 in which said plurality of signal lines include a video signal line and a shutter pulse line, said electrical isolation circuit means further including interference preventing means for preventing interference from shutter pulse signals on said video signal line.

5. The electrical isolation circuit according to claim 4 in which said interference preventing means comprises switch means for interrupting said video signal when a shutter pulse is received.

6. The electrical isolation circuit according to claim 5 in which said switch means is a transistor switch; said transistor switch being normally on; and circuit means for turning said transistor switch off when a shutter pulse is received.

7. The electrical isolation circuit according to claim 6 in which said transistor switch comprises a MOS FET transistor switch.

8. The electrical isolation circuit according to claim 7 wherein at least some of said plurality of signal lines transmit a plurality of timing pulses, and further including an isolating pulse transformer for each signal line transmitting a timing pulse; timing pulse converting means for converting each timing pulse to a leading and lagging spike; and timing pulse reconstructing means for reconstructing said timing pulses on a secondary side of each of said pulse transformers.

9. The electrical isolation circuit according to claim 8 in which said timing pulse converting means comprises; a resistor in series with said pulse transformer primary; and a logic buffer driving said timing pulses whereby pulses much longer then the time constant of said resistor and transformer are passed.

10. The electrical isolation circuit according to claim 9 in which said timing pulse reconstructing means comprises; biasing means biasing said timing pulse spikes to a reference voltage; and a hysteresis buffer which changes state to reconstruct said timing pulses.

11. The electrical isolation circuit according to claim 7 including isolation processing means for processing and isolating bidirectional data signals.

12. The electrical isolation circuit according to claim 11 in which said isolation processing means comprises; a pulse transformer; and translating means for a carrier signal into an open collector signal for translating transmission across said pulse transformer.

13. The electrical isolation circuit according to claim 12 in which said translating means comprises; an electronic shunt switch connected to the primary and secondary of said pulse transformer; a resistor connected to a winding on said pulse transformer; and means applying an AC voltage source to said pulse transformer through said resistor.

14. The electrical isolation circuit according to claim 13 in which said electronic shunt switch comprises; first detecting means for detecting and translating said carrier signal to a logic level; and second detector means detecting a low carrier level as a result of a low logic signal level; whereby said bidirectional data signal are transferred from said pulse transformer primary or vice versa.

15. The electrical isolation circuit according to claim 14 in which said first detecting means comprises; a transistor in series with a capacitor for detecting said carrier signal; and an open collector switch to translate said detected carrier signal to said logic level.

16. The electrical isolation circuit according to claim 15 wherein at least some of said plurality of signal lines transmit a plurality of timing pulses, and further including an isolating pulse transformer for each signal line transmitting a timing pulse; timing pulse converting means for converting each timing pulse to a leading and lagging spike; and timing pulse reconstructing means for reconstructing said timing pulses on a secondary side of each of said pulse transformers.

17. The electrical isolation circuit according to claim 16 in which said timing pulse converting means comprises; a resistor in series with said pulse transformer primary; and a logic buffer driving said timing pulses whereby pulses much longer then the time constant of said resistor and transformer are passed.

18. The electrical isolation circuit according to claim 1 including isolation processing means for processing and bidirectional data signals.

19. The electrical isolation circuit according to claim 18 in which said isolation processing means comprises; a pulse transformer and; translating means for translating a carrier signal into an open collector signal for transmission across said pulse transformer.

20. The electrical isolation circuit according to claim 19 in which said translating means comprises; an electronic shunt switch connected to the primary and secondary of said pulse transformer; a resistor connected to a winding on said pulse transformer; and means applying an AC voltage source to said pulse transformer through said resistor.

21. The electrical isolation circuit according to claim 20 in which said electronic shunt switch comprises; first detecting means for detecting and translating said carrier signal to a logic level and; second detector means detecting a low carrier level as a result of a low logic signal level; whereby said bidirectional data signals are transferred from said pulse transformer primary or vice versa.

22. The electrical isolation circuit according to claim 21 in which said first detecting means comprises; a transistor in series with a capacitor for detecting said carrier signal; and an open collector switch to translate said detected carrier signal to said logic level.

23. The electrical isolation circuit according to claim 1 wherein at least some of said plurality of signal lines transmit a plurality of timing pulses, and further including an isolating pulse transformer for each signal line transmitting a timing pulse; timing pulse converting means for converting each timing pulse to a leading and lagging spike; and timing pulse reconstructing means for reconstructing said timing pulses on a secondary side of each of said pulse transformers.

24. The electrical isolation circuit according to claim 23 in which said timing pulse converting means comprises; a resistor in series with said pulse transformer primary; and a logic buffer driving said timing pulses whereby pulses much longer then the time constant of said resistor and transformer are passed.

25. The electrical isolation circuit according to claim 24 in which said timing pulse reconstructing means comprises; biasing means biasing said timing pulse spikes to a reference voltage; and a hysteresis buffer which changes state to reconstruct said timing pulses.

26. The electrical isolation circuit according to claim 1 in which said cable delay compensating means comprises;

timing reference deriving means for providing a pilot pulse;

an isolation transformer receiving said pilot pulse;

correlated double sampling pulse generating means generating correlated double sampling pulse outputs to a correlated double sampling circuit for recovering a signal output from said CCD sensor.

27. The electrical isolation circuit according to claim 26 in which said timing reference deriving means comprises deriving a timing reference signal from a driver for said CCD sensor.

28. The electrical isolation circuit according to claim 27 including a DC blocking circuit connected to said driver for blocking a DC component of said timing reference signal from said isolation transformer.

29. The electrical isolation circuit according to claim 28 in which said DC blocking circuit comprises a resistor in parallel with a capacitor connected to said isolation transformer.

* * * * *

UNITED STATES PATENT AND TRADEMARK OFFICE
CERTIFICATE OF CORRECTION

PATENT NO.    : 5,913,817
DATED         : June 22, 1999
INVENTOR(S)   : David B. Lee It is certified that error appears in the above-identified patent and that said Letters Patent is hereby corrected as shown below:

Column 2,
Line 7, delete "isolating";

Column 4,
Line 41, after "T3" insert "and";

Claim 12,
Line 3, (Column 7, line 17), after "means for" insert "translating";

Claim 14,
Line 6, (Column 7, line 31), "signal" should be "signals";

Claim 18,
Line 3, (Column 7, line 55), before "bidirectional" insert "isolating";

Claim 26,
Line 5, (Column 8, line 44), after "pulse;" insert -- and --.

Signed and Sealed this

Twenty-sixth Day of June, 2001

*Attest:*

*Attesting Officer*

NICHOLAS P. GODICI
*Acting Director of the United States Patent and Trademark Office*